United States Patent [19]

Jenkins

[11] Patent Number: 4,462,736
[45] Date of Patent: Jul. 31, 1984

[54] PAPER BATCH SELECTOR

[76] Inventor: Carrell L. Jenkins, 20 Skidmore Ct., Towson, Md. 21204

[21] Appl. No.: 445,078

[22] Filed: Nov. 29, 1982

[51] Int. Cl.³ ............................................. B65G 59/02
[52] U.S. Cl. .................................... 414/114; 271/113; 294/1 R
[58] Field of Search ................ 414/114, 901, 54, 119, 414/117, 123, 129, 131, 330; 271/113; 235/89 R; 294/1 R

[56] References Cited

U.S. PATENT DOCUMENTS

| | | | |
|---|---|---|---|
| 1,253,797 | 1/1918 | Duncan et al. | 414/131 X |
| 2,556,214 | 6/1951 | Pottle | 414/901 X |
| 2,619,883 | 12/1952 | Andren . | |
| 3,176,859 | 4/1965 | Prager | 414/114 |
| 3,205,739 | 9/1965 | Myer-Jagenberg . | |
| 3,741,410 | 6/1973 | Henschke et al. | 414/129 |

Primary Examiner—Frank E. Werner
Attorney, Agent, or Firm—John F. McClellan, Sr.

[57] ABSTRACT

A manually operated system for dividing a stack of paper sheets successively into equal batches includes a bladed hub slidably and rotatably supported on a base by an upright shaft in position for the blades, which are somewhat sharp and are successively stepped in relation like steps in a spiral staircase, to engage and partially separate successive batches upon rotation of the bladed hub; in preferred embodiment each blade has an upright structure adjacent the outer end for thrusting against and offsetting each batch engaged, for easier manual pick-up of the batch.

9 Claims, 8 Drawing Figures

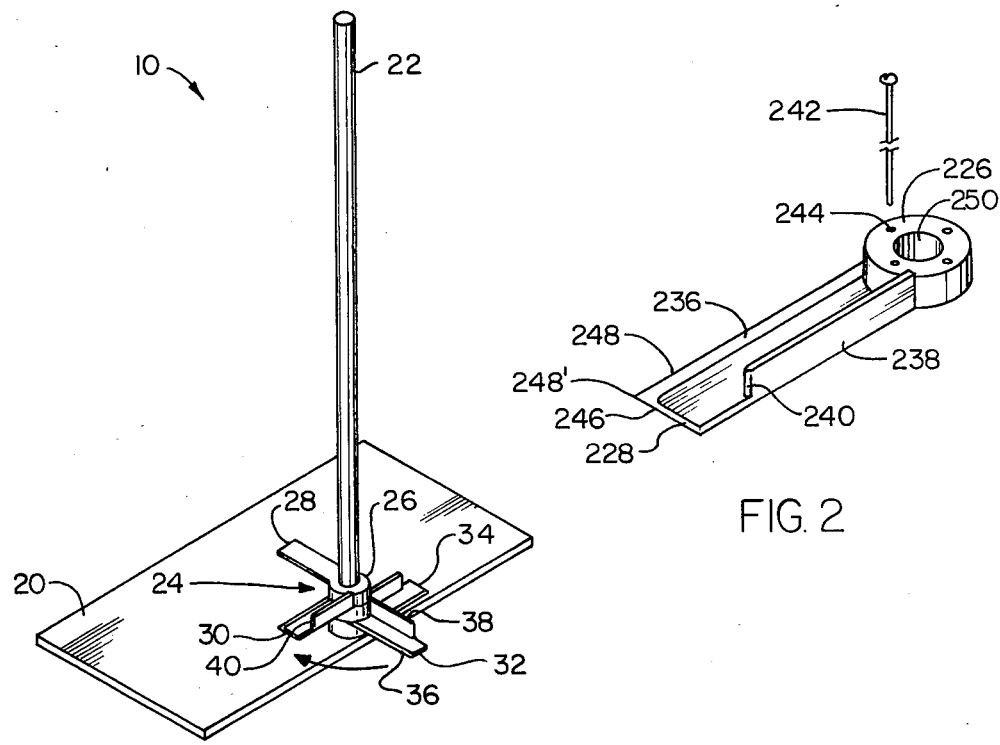
FIG. 1
FIG. 2
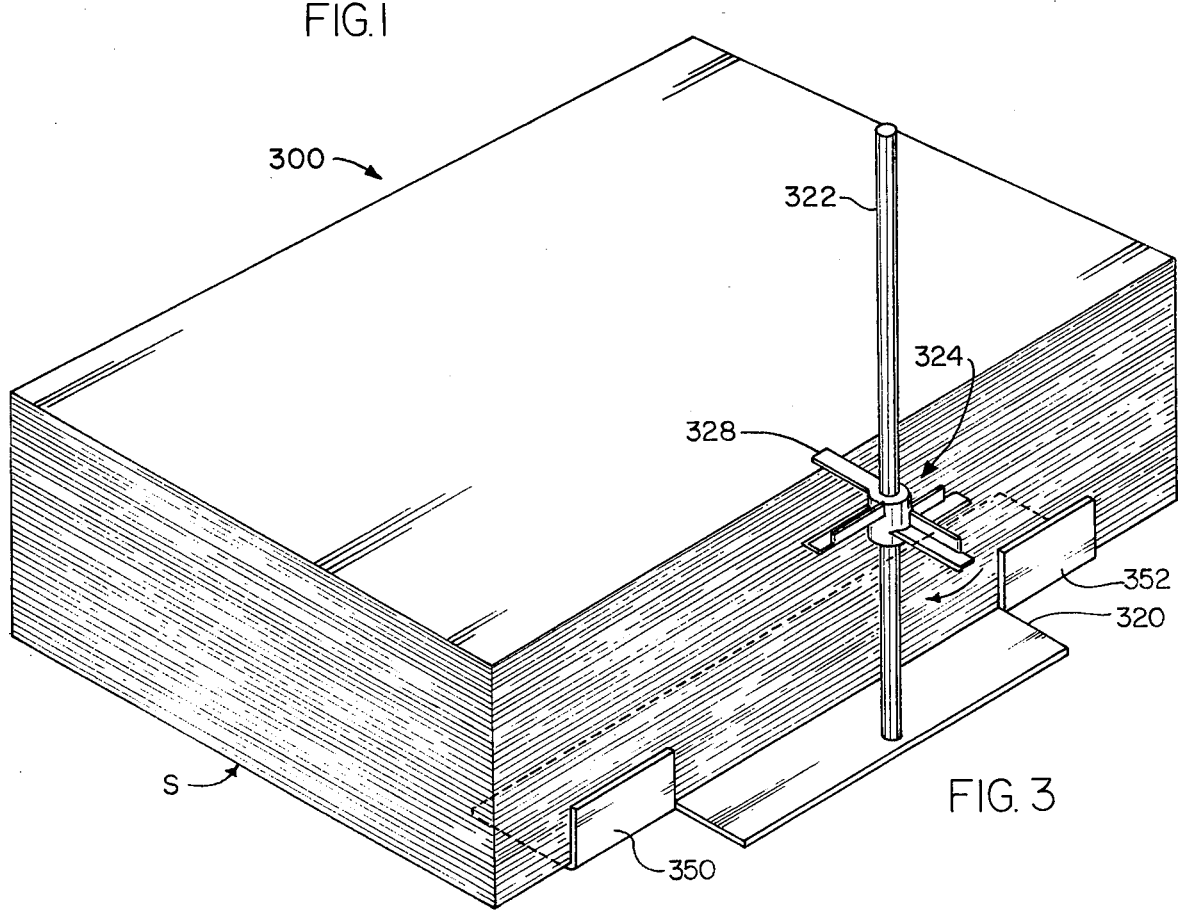
FIG. 3

PAPER BATCH SELECTOR

FIELD OF THE INVENTION

This invention relates generally to materials handling and particularly to a manual tool for use in dividing a stack of paper into a succession of pre-selectable equa-lincrement batches or lots.

PRIOR ART

Disclosures in U.S. patents relating to stack dividing have been made:

U.S. Pat. No. 2,619,883 issued to K. H. Andren on Dec. 2, 1952 discloses means including markers for indicating desired divisions in a stack of sheets;

U.S. Pat. No. 3,205,739 issued to G. Myer-Jagenberg on Sept. 14, 1965 discloses an oscillating type stack divider.

Relatively complex mechanisms such as those are not suited for small office use; what is needed as conceived and built by the present inventor is strikingly different in concept and operation, and perhaps a thousand times less expensive.

SUMMARY OF THE INVENTION

The main purpose of the paper batch selector is to insure that a relatively uniform amount of paper is selected each time without depending on a "feel" or "look" judgment by a worker for each batch selected. Batch selection is a step necessary, for example, for punching holes in large quantities of paper in offices or reproduction departments (as opposed to printing organizations). When a worker's judgment is used in batch selection, the size of the batches will vary. Batches smaller than optimum size result in more operations to process a stack of paper. Batches larger than optimum result in incomplete punching or damage to equipment from overloading. Production is slower when a worker is making a judgment every time a batch is selected.

For instance, the optimum amount of 20 lb. paper to be punched at one time may be twenty-five sheets. If one thousand sheets are to be punched, the operator must make forty selections if it is to be done most efficiently. If the operator's judgment results in twenty sheets being selected (on average) each time, then fifty punching operations must be performed. If the operator, on the other hand, selects some portions of thirty sheets each, the machine is overloaded. This often results in incomplete punching, repeated punching of the same portion of paper to force the machine to complete the punch or, perhaps, a broken machine and a job that can't be completed on time.

Other important objects of the invention are to provide a manually operated paper batch selector system which not only lifts a portion of each batch but also, in turn, can automatically offset each batch relative to the stack for easy manual pick-up, and which can be operated with either hand.

Still further objects are to provide a system as described which does not mar paper, which can work any edge of a stack, which is easy and safe to use, which is quiet, convenient and takes up little space in operation and in storage and which is size-adaptable and can work most of the usual weights of paper.

Yet further objects are to provide a system as described which can have a self-positioning feature, and a batchsize adjustment as optional features, which is economical, attractive in appearance and which is damage resistant and durable.

BRIEF DESCRIPTION OF THE DRAWINGS

The above and other objects and advantages of this invention will become more readily apparent on examination of the following description, including the drawings in which like reference numerals refer to like parts.

FIG. 1 is a perspective view of the invention in a first embodiment;

FIG. 2 is a perspective view of a detail of the invention in a second embodiment (different affixation detail);

FIG. 3 is a perspective view of a third embodiment (different base) in typical preliminary operation position of the invention at a stack of paper sheets in preparation for a first cycle of operation;

DETAILED DESCRIPTION

Figure 4:
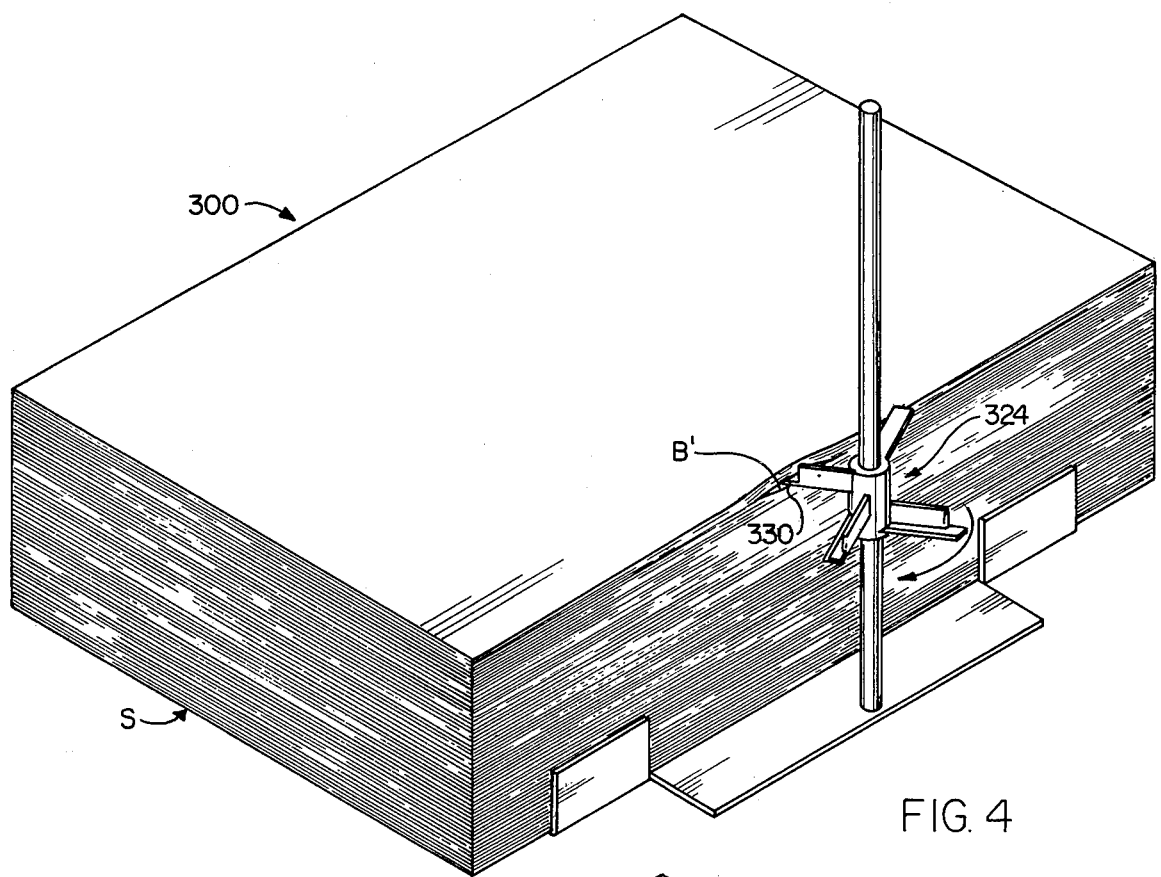
FIG. 4 is a perspective view of the third embodiment with the first cycle of operation commenced.

FIG. 1 shows the invention in embodiment 10 as comprising a rectangular planar base 20 with a shaft or cylindrical tube or rod 22 affixed upright thereon and on the rod, a rotor 24 which can slide axially and comprises a hub 26 with preferably four blades 28, 30, 32, 34 radiating from it. In this embodiment all parts of the hub and blades are unitary, and may be of cast metal.

The blades are preferably at right angles to each other but are sequentially stepped equal amounts in elevation along the hub (blade spacing) 28 being highest, 30 next, 32 next, and 34 lowest. This relation of the blades is similar to the relation of successive steps in a circular staircase.

Rotation is clockwise (arrow) in the apparatus shown; it could be counterclockwise in a mirror-image construction of the invention, if desired.

The blades are preferably flat on the bottom and the bottoms are in planes perpendicular to the axis of the hub. Each blade has a semi-sharp leading edge portion produced by a bevel 36 on the top of the blade, and may have a flanged trailing edge. The entire leading edge need not necessarily be sharp, depending on the amount engaged.

Each flange 38 may be an upright uniform-height member integral with the blade and hub and terminating in upright end structure 40 short of the end of the blade. The height of the flanges 38 slightly exceeds the blade spacing and each upright end 40 preferably has sharp corners removed.

The blade vertical spacing is fixed in this unitary embodiment; spacing of 3/32 inch (1.2 mm) will, for example, select approximately twenty-five sheets of 20 pound (9 kg) bond paper, in operation.

FIG. 2 shows a typical blade 228 of a second embodiment, like those of the first embodiment except that assembly may be by machine screw 242 or bolt, through matched holes 244 in the individual hub portion 226 integral with each blade and fitted on the rod by a concentric bore 250.

The flate blade bottom 246, bevel 236 on the top of the blade to produce a sharp leading edge 248, and upright flange 238 are typical of all embodiments. Corner 248' is preferably sharp, but slightly rounded in plan view. "Sharp" means keen but not finger-cutting, in this disclosure. The upright end 240 is preferably slightly rounded to protect the edge of the batches of paper which it thrusts against, as will be described.

FIG. 3 shows a third embodiment 300, differing from the first embodiment in the detail of the base 320 which has co-aligned upright guards 350, 352 for positioning the rod 322 a distance from a stack of paper S suitable for the particular size rotor used.

Operation is as follows: one blade (any blade, but preferably the highest 328 as shown here) is rested on the top of the stack of papers S. The rotor 324 is then rotated (arrow) causing the leading edge of the next succeeding blade to slice between sheets of paper at a proper location, and define the next batch to be separated, before 328 disengages.

FIG. 4 shows the slicing between and separation at B' of sheets of the stack S by blade 330 of the rotor 324, partway through a cycle. Each quarter-turn of the rotor is a working cycle, except that when the lowest blade completes a cycle the top blade drops to the top of the stack and that quarter turn repositions the rotor but does no paper separation. "Quarter-turn" refers to this four-bladed embodiment.

Figure 5:
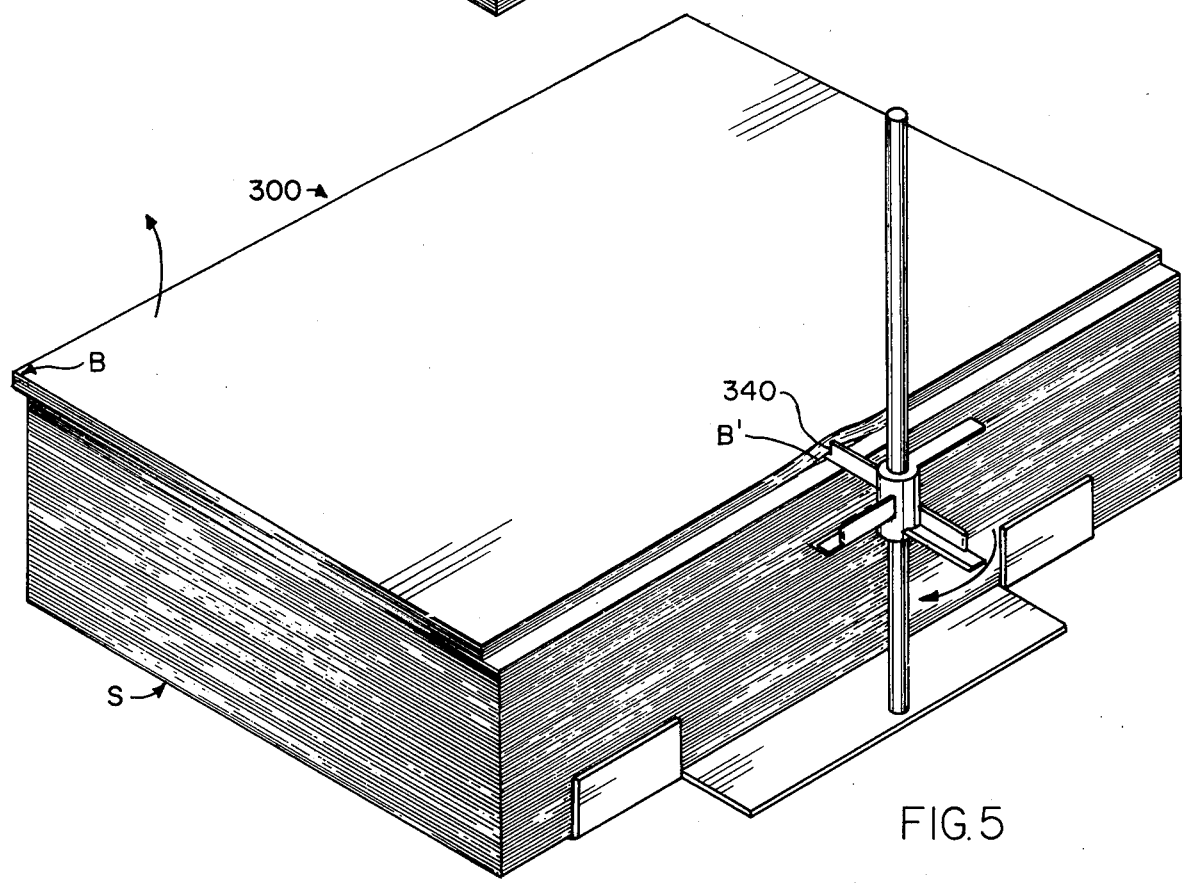
FIG. 5 is a perspective view of the third embodiment with the first cycle of operation complete.

FIG. 5 shows the first cycle completed with the batch B of paper separated at B' and offset at the rear from the stack S by the upright end 340, ready for manual pick-off (upward arrow).

Figure 6:
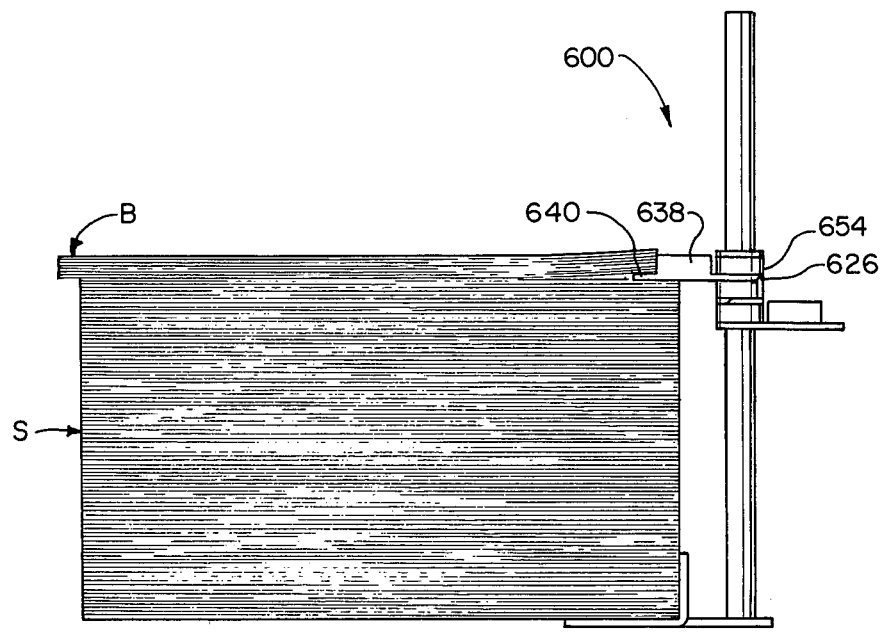
FIG. 6 is a side elevational view of a fourth embodiment (spacing shims provided) in the same position as that of FIG. 5.

FIG. 6 shows a fourth embodiment (spacers 654 between hub portions to adjust batch size) in the same position as that shown in FIG. 5. The upright end 640 of the flange 638 does the pushing which offsets the batch B of paper from stack S and is high enough to overlap the next blade, without the spacers, which even it. The amount of offset is governed by how far the end of the flange extends from the hub 626, all other things being equal. It will be appreciated that the invention will operate even if flange is coextensive with the blade, but preferably it is shorter to allow the end of the flange to point more directly at the stack during offsetting. In operation the rotor is rotated and progresses down every complete revolution until the entire stack is processed.

The invention will operate with a different number of blades but four blades work well. The spacers may be of any thickness desired for shimming to produce the required number of sheets per lot or batch, in embodiment 600.

Figure 7:
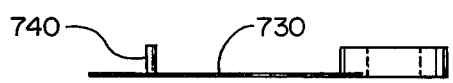
FIG. 7 is a side elevational fragmentary detail of a fifth embodiment (pin instead of flange)

FIG. 7 shows a fifth embodiment in which the upright or off-setting blade structure is a pin 740 affixed to the blades (730) shown. This may be lighter in weight than the flanged blade and more flexible in operation.

Figure 8:
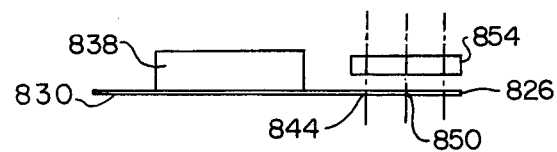
FIG. 8 is a similar view of a hubless, flanged embodiment.

FIG. 8 shows a sixth embodiment in which spacers or shims 854 separate flanged blades (830 shown, with flange 838) with hub structure or hub portions 826 the same thickness as the blades and co-planar with them. Spacers 854 produce the inter-blade spacing. 844 and 850 denote respectively holes for bolt attachment, and hub bore, as in FIG. 2.

Differences are shown in the various embodiments. Features not shown may be suitable features disclosed in any of the embodiments.

Material for the invention may be rigid plastic, brass or stainless steel. The base may be 1/16 inch (1.5 mm) thick and 4 by 6 inches (10 cm by 15 cm) in width and breadth. The paper guides on the base may easily be so-located in relation to the axis of the rod as to produce any desired offset from, for example, $\frac{1}{4}$ inch (6 mm) to $\frac{1}{2}$ inch (13 mm) assuming that the blades protrude beyond the end of the flanges (beyond the upright structure) by $\frac{1}{2}$ inch (13 mm). If the guides are not used, but instead the plain base is used, the offset may be adjusted by adjusting the amount the base is inserted beneath a stack, which amount varies the distance from stack to axis.

The rod (or tube) may be $\frac{1}{4}$ inch (6 mm) in diameter and 8 inches (20 cm) high.

The blades may be 1/32 inch (0.8 mm) thick by 5/16 inch (0.8 cm) wide and may extend 1⅜inch (3.4 cm) from the rod axis and have a flange at least $\frac{1}{4}$ inch (6 mm) high, which may be ¾ inch (18 mm) long and extend to within $\frac{1}{4}$ inch (6 mm) of the end of the blade in one representative embodiment. Distance from the axis to the upright end of the flange should exceed the distance from the axis to the stack of paper.

As generally indicated the word "sharp" as used in the specifications and claims means substantially sharp enough to wedge between and separate sheets of paper in a stack but substantially dull enough to prevent slicing paper (and fingers) in normal usage. This might require an edge radius of about one thousandth of an inch.

The word "hub" used in the specification and claims may denote a rod-engaging portion of any thickness relative to the blades.

This invention is not to be construed as limited to the particular forms disclosed herein, since these are to be regarded as illustrative rather than restrictive. It is, therefore, to be understood that the invention may be practiced within the scope of the claims otherwise than as specifically described. For example, as noted, the axially successively-stepped blades could be of opposite-hand to those shown and rotational direction correspondingly opposite.

What is claimed and desired to be protected by U.S. Letters Patent is:

1. A system of a type suitable for dividing by manual power a stack of sheets of paper successively into equal batches, comprising: means for supporting said system adjacent a said stack of sheets of paper, including a base and a shaft upright on the base, rotor means for rotating on said shift and sliding axially therealong, a plurality of blades radiating from said rotor means in successively stepped axial relation as in a special staircase, proportioned for defining successive batches of sheets of paper upon said rotating and with the help of said axis sliding said rotor means progressing down each revolution in said rotating, each said blade having a sharp leading edge portion for passing between sheets of paper during said rotation, and an upright structure adjacent each blade sharp leading edge portion in position for thrusting against and offsetting a said batch of paper during said rotating.

2. A system as recited in claim 1, a flange extending along an upper portion of each said blade and having an outer end, said upright structure comprising said outer end, said upright structure being rounded, and said upright structure extending upwardly a distance providing in said rotating an overlap with another said blade.

3. A system as recited in claim 1, said upright structure being a pin.

4. A system as recited in claim 1, each said blade having a bottom, said bottom being substantially flat, said plurality of blades comprising four blades equally spaced around said rotor means, said rotor means comprising a hub, and said hub and blades being unitary.

5. A system as recited in claim 1, said rotor means comprising a plurality of hub portions, a plurality of blades having each a separate said hub portion, means for detachably joining said separate hub portions, and means for shimming apart said separate hub portions to adjust said successively stepped axial relation.

6. A system as recited in claim 1, said base having upright guard structure thereon for positioning said system relative to a said stack of paper sheets.

7. A system as recited in claim 1, wherein the distance from the axis of said rotor means to the upright structure exceeds the distance from said axis to a said stack of sheets of paper.

8. A paper stack divider of a type suitable for manual rotation comprising: a rotor having hub structure, a plurality of blades extending from the hub structure in the relation of successive steps in a spiral staircase, for dividing the paper stack into successive batches by said rotation, a shaft slidably and rotatably supporting said rotor, and a base fixing said shaft upright in position for permitting sliding of the rotor vertically downward along a said paper stack once each revolution of the rotor whereby successive batches of said stack are offset from a remainder of said stack.

9. A paper stack divider as recited in claim 8, each blade having a sharp leading edge porportioned for passing into a said stack and separating a batch portion of said stack, each blade having an upright structure proportioned for offsetting said separated portion, on rotation of said rotor.

* * * * *

UNITED STATES PATENT AND TRADEMARK OFFICE
CERTIFICATE OF CORRECTION

PATENT NO. : 4,462,736
DATED : July 31, 1984
INVENTOR(S) : CARRELL L. JENKINS

It is certified that error appears in the above-identified patent and that said Letters Patent are hereby corrected as shown below:

Claim 1, line 8, delete "special" and insert -- spiral --.

Signed and Sealed this

Twenty-fifth Day of December 1984

[SEAL]

Attest:

GERALD J. MOSSINGHOFF

Attesting Officer

Commissioner of Patents and Trademarks